United States Patent
Slater et al.

(10) Patent No.: US 11,436,092 B2
(45) Date of Patent: Sep. 6, 2022

(54) BACKUP OBJECTS FOR FULLY PROVISIONED VOLUMES WITH THIN LISTS OF CHUNK SIGNATURES

(71) Applicant: Hewlett Packard Enterprise Development LP, Spring, TX (US)

(72) Inventors: Alastair Slater, Chepstow (GB); Ieuan James Henry, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 105 days.

(21) Appl. No.: 16/852,711

(22) Filed: Apr. 20, 2020

(65) Prior Publication Data
US 2021/0326213 A1 Oct. 21, 2021

(51) Int. Cl.
*G06F 11/14* (2006.01)
*G06F 16/174* (2019.01)

(52) U.S. Cl.
CPC ...... *G06F 11/1453* (2013.01); *G06F 16/1756* (2019.01)

(58) Field of Classification Search
CPC .. G06F 3/0608; G06F 3/0641; G06F 11/1451; G06F 11/1453; G06F 16/1744; G06F 16/1748; G06F 16/1752; G06F 16/1756
See application file for complete search history.

(56) References Cited

U.S. PATENT DOCUMENTS

| 5,517,632 | A | 5/1996 | Matsumoto et al. | |
|---|---|---|---|---|
| 7,694,103 | B1 * | 4/2010 | Kushwah | G06F 13/28 711/171 |
| 8,346,727 | B1 * | 1/2013 | Chester | G06F 16/188 707/640 |
| 8,484,427 | B1 * | 7/2013 | Goldobin | G06F 11/1453 711/162 |
| 8,671,082 | B1 * | 3/2014 | Yadav | G06F 16/24 707/692 |

(Continued)

FOREIGN PATENT DOCUMENTS

| CN | 102150124 A | 8/2011 |
|---|---|---|
| EP | 2333653 A1 | 6/2011 |

OTHER PUBLICATIONS

Thin Provisioning Explained by N-Able Aug. 12, 2019 https://www.n-able.com/blog/thin-provision-vs-thick-provision (Year: 2019).*

(Continued)

*Primary Examiner* — Joseph O Schell
(74) *Attorney, Agent, or Firm* — Hewlett Packard Enterprise Patent Department

(57) ABSTRACT

Examples may include backup objects for fully provisioned volumes with thin lists of chunk signatures. Examples may generate one or more full lists of chunk signatures for the address space of a fully provisioned volume, compare each chunk signature of the full list to an unused region chunk signature representing a chunk of an unused region of the fully provisioned volume, generate metadata to indicate used regions of the fully provisioned volume, based on the comparisons, and generate from the one or more full lists, one or more thin lists omitting all chunk signatures determined to match the unused region chunk signature.

20 Claims, 5 Drawing Sheets

(56) References Cited

U.S. PATENT DOCUMENTS

| | | | |
|---|---|---|---|
| 8,745,003 B1* | 6/2014 | Patterson | G06F 16/128 |
| | | | 707/639 |
| 8,782,003 B1* | 7/2014 | Patterson | G06F 16/1734 |
| | | | 707/624 |
| 8,898,114 B1* | 11/2014 | Feathergill | G06F 16/1752 |
| | | | 707/648 |
| 9,483,481 B2 | 11/2016 | Gheith et al. | |
| 10,019,318 B1 | 7/2018 | Paulzagade et al. | |
| 10,248,623 B1* | 4/2019 | Chen | G06F 16/24556 |
| 10,496,496 B2 | 12/2019 | Slater et al. | |
| 2005/0097077 A1 | 5/2005 | Bolosky et al. | |
| 2008/0282047 A1 | 11/2008 | Arakawa et al. | |
| 2012/0233417 A1 | 9/2012 | Kalach et al. | |
| 2013/0080397 A1* | 3/2013 | Payne | G06F 11/1469 |
| | | | 707/681 |
| 2013/0159646 A1* | 6/2013 | Atzmon | G06F 11/1466 |
| | | | 711/162 |
| 2014/0006858 A1* | 1/2014 | Heitman | G06F 11/1662 |
| | | | 714/19 |
| 2014/0059313 A1 | 2/2014 | Hwang et al. | |
| 2015/0081994 A1 | 3/2015 | Christopher et al. | |
| 2015/0095596 A1 | 4/2015 | Yang et al. | |
| 2015/0112939 A1* | 4/2015 | Cantwell | G06F 16/14 |
| | | | 707/646 |
| 2015/0169613 A1* | 6/2015 | Bshara | G06F 16/9014 |
| | | | 707/692 |
| 2017/0293531 A1 | 10/2017 | Watkins et al. | |
| 2018/0165161 A1 | 6/2018 | Slater et al. | |
| 2021/0019333 A1* | 1/2021 | Attarde | G06F 16/215 |

OTHER PUBLICATIONS

HPE, "Spend Less On All-Flash Storage", Rev. 3, Nov. 2019, 4 pages.

Lance Ashdown, "RMAN Backup Concepts", Oracle Database, Backup and Recovery User's Guide, Chapter 8, Jul. 2013, 23 pages.

Mandagere et al., "Demystifying Data Deduplication", ACM, 2008, pp. 12-17.

* cited by examiner

BACKUP OBJECTS FOR FULLY PROVISIONED VOLUMES WITH THIN LISTS OF CHUNK SIGNATURES

BACKGROUND

A client computing device, such as a host server or the like, may store data in a primary storage array, and may execute workloads against the data stored in the primary storage array. In some examples, for purposes such as redundancy and data protection, the data stored in the primary storage array may be backed up in a backup appliance separate from both the client computing device and the primary storage array. In some examples, the backup appliance may store data in a deduplicated form such that the data is stored more compactly than on the primary storage array, for example.

BRIEF DESCRIPTION OF THE DRAWINGS

The following detailed description references the drawings, wherein.

DETAILED DESCRIPTION

Figure 1:
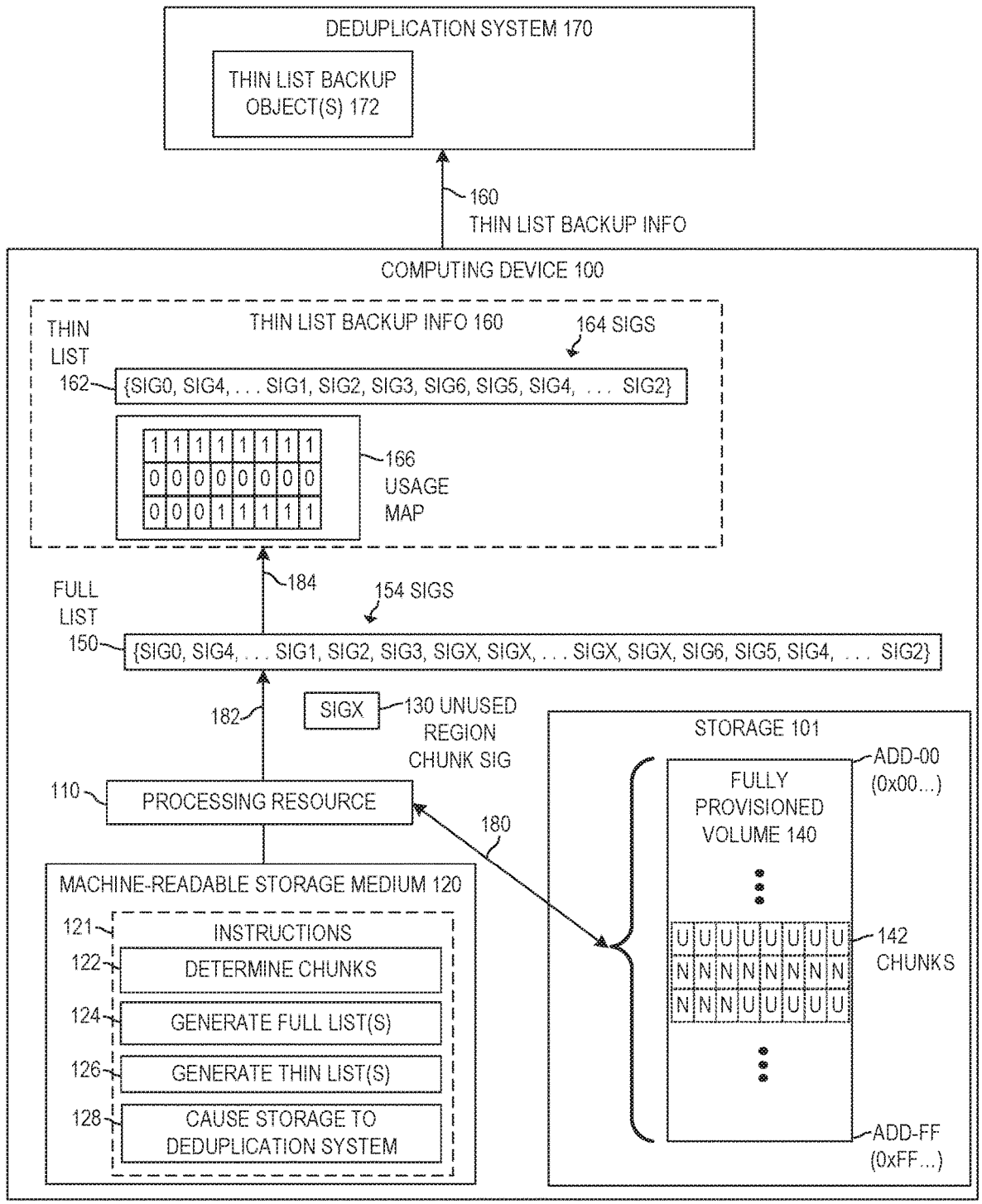
FIG. 1 is a block diagram of an example computing environment to generate thin list(s) of chunk signatures.

As noted above, a computing device (such as a host, server, storage array, etc.) may back up data by storing the data in a computing system able to perform deduplication on the data (referred to herein as a "deduplication system") in order to store the data in a deduplicated form that is more compact than a non-deduplicated form.

In examples described herein, a process of deduplication may be performed by a deduplication system on a collection of data from another computing system, such as from a storage array (or another type of primary storage device). For example, the contents of a given volume (e.g., a virtual volume) of a storage device may be backed up at successive points in time. In such examples, a first backup of the given volume to a deduplication system may be a "complete" backup (as opposed to an incremental backup) comprising a representation of the entire contents of the volume at a first point in time (e.g., based on a snapshot of the volume at that first point in time). Such a "complete" backup may also be referred to as a "full" backup, but the term "complete" backup will be used herein to avoid confusion (i.e., with "full" lists described below).

Each subsequent backup of the given volume, representing the contents of the volume at a respective later point in time (e.g., based on a snapshot of the volume at that later point in time) may be an "incremental" backup (as opposed to a complete or full backup) comprising a representation of the changes to the volume between the respective later point in time and a prior point in time. In such examples, much less data may be provided to the deduplication system for an incremental backup compared to the original complete backup for the volume. In some examples, the deduplication system may utilize a complete backup and a later incremental backup to generate a "synthetic complete" backup, representing the entire contents of the volume at the point in time represented by the incremental backup. Such a "synthetic complete" backup may also be referred to as a "synthetic full" backup, but the term "synthetic complete" backup will be used herein to avoid confusion with other concepts herein.

In some examples, a volume may be a "virtual volume" of a computing system (such as a storage array), comprising a virtual address space that may be flexibly mapped to physical addresses of one or more physical storage devices (e.g., hard disk drives (HDDs), solid state drives (SSDs), and the like, or a combination thereof) for storage of data "on" the virtual volume. In such examples, data stored to a portion of the address space of a virtual volume may be actually be stored in physical storage location(s) of one or more physical storage devices to which that portion of the address space of the virtual volume is mapped.

In some examples, a virtual volume may be "fully provisioned", meaning that physical storage space on physical storage device(s) has been allocated to the entire address space of the fully provisioned virtual volume. In such examples, each address in the virtual address space of the fully provisioned volume is mapped to physical storage space on a physical storage device to actually store any data written to the corresponding address in the virtual address space of the fully provisioned virtual volume.

In contrast, a virtual volume may be "thin provisioned", meaning that physical storage space on physical storage device(s) has not necessarily been allocated to the entire address space of the fully provisioned virtual volume. In such examples, available physical storage space on physical storage device(s) may be allocated on-demand to the virtual address space of the thin provisioned virtual volume. In such examples, physical storage space on physical storage device(s) may not be allocated to much of the address space of the thin provisioned virtual volume. Such portions of the virtual address space without allocated physical storage may be referred to as "unallocated" portions of the virtual volume, while portions of the virtual address space to which physical storage has been allocated may be referred to herein as "allocated" portions of the virtual volume.

In some examples, backing up a fully provisioned virtual volume may involve backing up the data present in every location of the fully provisioned virtual volume, even if much of the fully provisioned virtual volume is not actually being used by any application to store meaningful data (e.g., has not been written to by any application since the creation of the fully provisioned virtual volume). As described further below, this may lead to inefficiencies in performing a complete backup for a fully provisioned virtual volume and in generating a synthetic complete backup for a fully provisioned virtual volume. Examples described herein may address these issues, as described herein.

Some examples will now be described herein in relation to FIG. 1, which is a block diagram of an example computing environment 105 to generate thin list(s) of chunk signatures. In the example illustrated in FIG. 1, computing environment 105 comprises a computing device 100 and a deduplication backup system 170 (which may be referred to herein as a "deduplication system" 170). In some examples, computing device 100 may be implemented by a storage array, or any other suitable type of computing device (e.g., server, etc.), and deduplication system 170 may be implemented by any suitable type of computing device (such as a storage array, storage appliance, server, or the like). Any function described herein as performed by any computing device (e.g., computing device 100, deduplication system 170, etc.) of any computing environment herein (e.g., computing environment 105) may be performed by instructions stored on at least one machine-readable storage medium and executable by one or more processing resources of that computing device.

Computing environment 105 may include backup agent instructions 121 to (at least partially) implement a backup agent to back up data stored by computing device 100 to deduplication system 170. In the example of FIG. 1, computing device 110 comprises at least one processing resource 110 and at least one machine-readable storage medium 120 comprising (e.g., encoded with) at least backup agent instructions 121 (including instructions 122, 124, 126, and 128) that are executable by the at least one processing resource 110 of computing device 100 to implement functionalities described herein in relation to instructions 121. Although, in the example of FIG. 1, backup agent instructions 121 are executed by computing device 100 (e.g., a primary storage array storing the data to be backed up), in other examples, backup agent instructions 121 may be executed by deduplication system 170 or another computing device (e.g., server) separate from, but in communication with, both computing device 100 and deduplication system 170. In the example of FIG. 1, computing device 100, deduplication system 170, and any other computing device(s) of computing environment 105 may communicate via one or more computer network(s). In examples described herein, a computer network may include, for example, a storage area network (SAN), a local area network (LAN), a virtual LAN (ULAN), a wireless local area network (WLAN), a virtual private network (VPN), the Internet, or the like, or a combination thereof.

Computing device 100 also comprises storage 101 that may be implemented by one or more physical storage devices to store data. The physical storage devices may be any suitable type of storage device (e.g., HDDs, SSDs, etc.) or any combination thereof. In some examples, computing device 100 may create a fully provisioned virtual volume 140 (which may be referred to herein as "fully provisioned volume 140" herein) on storage 101. As described above, as a fully provisioned volume, physical storage space on physical storage device(s) (e.g., of storage 101) is allocated to the entire address space of the fully provisioned volume 140. However, not all of the addresses of the fully provisioned volume 140 store meaningful data to the application(s) (e.g., host application(s)) that write to and/or read from the volume 140. In examples described herein, portions of a fully provisioned volume storing meaningful data, such as data written by a host application, volume metadata, or the like, may be considered "used" portions of a fully provisioned volume, while portions of the fully provisioned volume that are not used to store such meaningful data may be considered "unused" portions of the fully provisioned volume.

In some examples, such unused portions of a fully provisioned volume may store a defined data pattern such as, for example, all zeroes, or any other pre-defined pattern of data (e.g., ones and zeroes). In such examples, the defined data pattern may be a data pattern that it written to the entire (or the majority) of the fully provisioned volume when it is created. For example, computing device 100 may write the defined data pattern (e.g., all zeroes) to the volume when it is created, and before any host application writes meaningful data to the volume, or a host application may write an application-specific defined data pattern (e.g., a pattern of ones and/or zeroes) to most or all of the volume when it is created and before it writes any meaningful data to the volume. In examples described here, the defined data pattern may be used to create thin lists of chunk signatures, as described herein.

An example process of deduplication is described below in relation to the example of FIG. 1. Deduplication system 170 may store deduplicated representations of one or more collections of data. For example, data to be stored in deduplication system 170 may be divided into fixed or variable length sections referred to herein as "chunks", and deduplication system 170 may identify "duplicate" chunks having content identical to that of other chunk(s), store one (full or compressed) copy of each chunk not identified as being a duplicate of an already-stored chunk, and, for each duplicate chunk, store a reference (e.g., a pointer) to a stored copy of the chunk without storing the duplicate chunk again. In this manner, a deduplication process may often avoid storing duplicates of the same chunk in deduplication system 170. In such examples, the deduplication system may store a deduplicated representation of a collection of data, the deduplicated representation comprising selected data chunks and sufficient metadata to reconstruct the full version of the collection of data from the selected data chunks and the metadata.

For example, the metadata for a collection of data stored to deduplication system 170 may include a list of chunk signatures for the collection of data. An example will be described herein in relation to backing up the content of fully provisioned volume 140 to deduplication system 170. In such examples, fully provisioned volume 140 may be divided into a plurality of chunks 142 (a small portion of which are illustrated in FIG. 1 for explanatory purposes), wherein the chunks 142 together make up the data of the entire address space of fully provisioned volume 142. Computing device 100 may determine respective chunk signatures 154 for each of chunks 142 (a small portion of which are illustrated in FIG. 1 for explanatory purposes). In examples described herein, a "chunk signature" may be data representative of the content of a chunk, derived by applying a signature function to the chunk. In some examples, the signature function may be a hash function, and the chunk signature may be a hash (or hash value) of the chunk generated by applying the hash function on the chunk. Any suitable hash function may be used to generate the chunk signature. In other examples, any other suitable type of signature function may be used in place of a hash function to generate an appropriate chunk signature (e.g., a function to generate a suitable type of fingerprint). In examples described here, a signature function may be used that derives a given chunk signature from a given chunk such that the given chunk signature is representative of the content of the given chunk and is distinguishable, with a very high probability, from similarly-derived chunk signatures for other similarly-sized chunks. That is, the chunk signatures may be derived such that there is a very low probability of collisions (i.e., chunk signatures matching for chunks that do not have identical content) for similarly-sized chunks. Thus, in examples described herein, deduplication system may determine that two chunks contain identical content (for deduplication purposes) based on their chunk signatures matching.

For each of chunks 142 of fully provisioned volume 140, computing device 100 may store the chunk signature derived from the chunk in a full list 150 of chunk signatures for fully provisioned volume 140, such that full list 150 includes a respective chunk signature for each of the chunks of 142, with the respective chunk signatures stored in the full list 150 in the same order as the chunks themselves occur in fully provisioned volume 140. In such examples, computing device 100 may provide the full list 150 to deduplication system 170 for storage as a backup object in deduplication system representing the content of full provisioned volume 140 at a given point in time. Deduplication system 170 may then compare the chunk signatures of the full list 150 to the chunk signatures of the chunks already stored in deduplication system. For each chunk signature of the full list 150 for which deduplication system 170 does not find that the corresponding chunk (represented by that chunk signature) is already stored in deduplication system 170, deduplication system 170 may request that computing device 100 provide that chunk for storage. For each chunk signature of the full list 150 for which deduplication system 170 does find that the corresponding chunk is already stored in deduplication system 170, deduplication system 170 may omit requesting the chunk from computing device 100, since it already stores a copy in order to avoid storing duplicate chunks. In such examples, deduplication system 170 may store a full list 150 in a backup object to represent the content of fully provisioned volume 140, and also (e.g., separately) store a copy of each chunk represented by each chunk signature in full list 150, while attempting to avoid storing duplicate chunks (as described above).

Although much of the address space of a fully provisioned volume (e.g., volume 140) may not be used at a given time, the full list 150 of chunk signatures may still be proportional to the size of the volume 140, regardless of how much or little of the fully provisioned volume 140 is in use to store meaningful data (as described above), since there are no unallocated portions of volume 140. When a later backup of the volume 140 is performed to capture changes to the volume 140 relative to an earlier backup (i.e., an incremental backup), it may be possible to copy the portions of the full list 150 that represent data that has not changed since the earlier backup to generate a synthetic complete backup.

However, because the full list 150 is proportional to the size of fully provisioned volume 140 (e.g., one chunk signature for each 4 KB region of volume 140), regardless of how much of the volume is being used to store meaningful data, the performance of such an operation to generate a synthetic complete backup may be relatively poor, particularly the farther provisioned volume 140 is from being completely filled (i.e., at capacity).

To address these issues, examples described herein may generate a thin list by omitting from the full list each chunk signature that is determined to match a chunk signature of the defined data pattern of an unused of a fully provisioned volume, and may generate usage metadata to indicate the used portions of the volume to which the chunk signatures in the thin list correspond. In this manner, by storing the thin list and the usage metadata in a backup object for a fully provisioned volume, rather than a full list, the operation of generating a synthetic complete backup based on the thin list may be more efficient than the operation on the full list. For example, the thin list may have a size proportional to the usage of the fully provisioned volume (e.g., one chunk signature for each 4 KB portion of meaningful data), rather than proportional to the total capacity of the fully provisioned volume. So an operation of examining the thin list of chunk signatures and copying chunk signatures of unchanged regions may be much shorter than performing a similar operation on a full list for the fully provisioned volume.

Examples of generating thin lists will be described below in relation to FIGS. 1 and 2. As described above, FIG. 1 is a block diagram of an example computing environment 105 to generate thin list(s) of chunk signatures. FIG. 2 is a flowchart of an example method 200 that includes comparing each chunk signature of one or more full list(s) to an unused region chunk signature. Although execution of method 200 is described below with reference to computing device 100 of FIG. 1, other computing systems suitable for the execution of method 200 may be utilized (e.g., computing device 700 of FIG. 7, etc.). Additionally, implementation of method 200 is not limited to such examples.

Figure 2:
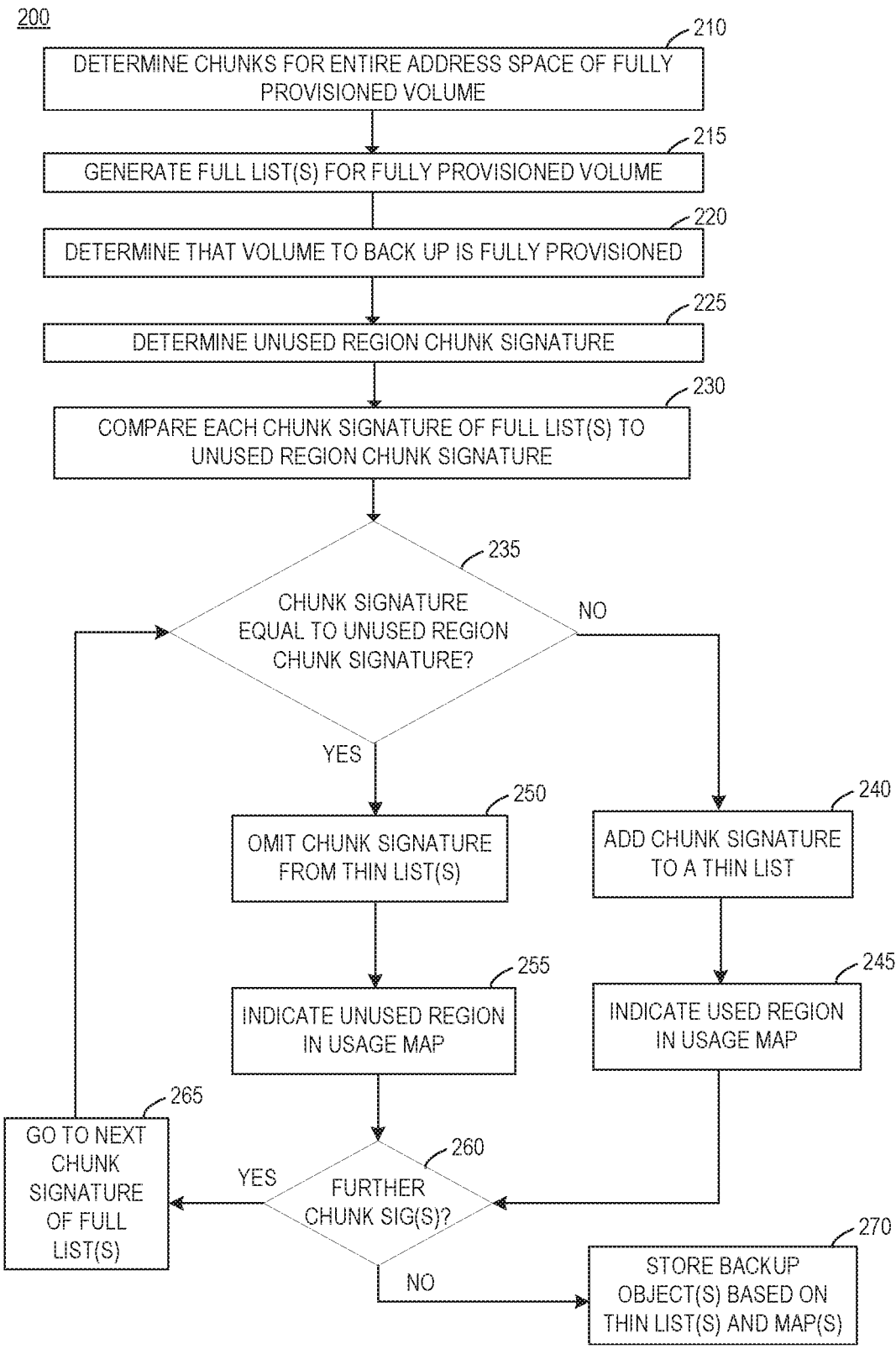
FIG. 2 is a flowchart of an example method that includes comparing each chunk signature of full list(s) to an unused region chunk signature.

Referring to FIGS. 1 and 2, at 210 of method 200, instructions 122 (e.g., of backup agent instructions 121), when executed by at least one processing resource 110, may determine a set of chunks 142 comprising the data content of an entire address space (e.g., ADD-00-ADD-FF) of volume 140 of computing system 100. As described above, a deduplication system may use chunks to identify duplicate regions of data in a collection of data. In some examples, chunks used by a deduplication system may have a fixed size (e.g., approximately 4 KB, or another suitable size), such that all chunks have the same size the fixed size). In other examples, chunks used by a deduplication system may have a variable size, such that chunks may have any of various different sizes within a range, from a minimum size to a maximum size.

In some examples, instructions 122 may perform a "chunking" process to determine the boundaries of the fixed or variable chunks 142 for the entire address space of volume 140. In other examples, instructions 122 may define the boundaries of the chunks 142 for volume 140 without making changes to volume 140 or altering the manner in which data is stored in volume 140. In other examples, another device or application may have performed the chunking or chunk definition process, and instructions 122 may determine the chunks 142 of volume 140 by accessing previously-generated information indicating the chunks 142 of volume 140.

At 215, instructions 124 may generate 182 one or more full lists 150 of chunk signatures 154. In some examples, instructions 124 may generate a single full list 150 of chunk signatures 154 for the entirety of the address space of volume 140 (i.e., from a first address ADD-00 to a last address ADD-FF), as illustrated in the example of FIG. 1, for use in backing up data of volume 140 at a given point in time. In such examples, full list 150 may represent the data content of the entire address space of volume 140. In some examples, to generate the full list 150, instructions may read the data of each chunk 142 of the entire address space of volume 140, and perform a signature function on the chunk 142 to generate a respective chunk signature 154 for each chunk 142 of the entire address space. In such examples, instructions 124 may store the generated chunk signatures 154 in full list 150. In the example of FIG. 1, individual chunk signatures are represented with reference symbols SIG0-SIG6 and SIGX, where chunk signatures with different symbols following the prefix "SIG" indicate different chunk signatures values, and chunk signatures with the same symbol following the prefix "SIG" indicate equal or matching chunk signatures. The example of FIG. 1 is simplified and illustrated with representative chunks, chunk signatures, etc., for purposes of explanation.

In other examples, (although not shown in FIG. 1) instructions 124 may generate a plurality of full lists 150 of chunk signatures 154, with each full list 150 comprising chunk signatures 154 for the chunks 142 of a respective portion of the address space of volume 140. The respective portions of the address space represented by the different full lists 150 may be any suitable portions of the volume 140. For example, each portion may represent a contiguous region of the address space of volume 140. In other examples, each portion may comprise several disparate (i.e. discontinuous) regions of the address space of volume 140 that are not contiguous with one another in the address space of volume 140. In such examples, the one or more full lists 150 may collectively represent the data content of the entire address space of volume 140. In examples described herein, a "full" list means that, for the address space of the volume represented by the list, the list includes a chunk signature for each chunk of the address space, omitting none. However, a full may cover less than all of a given volume. In such examples, a plurality of full lists collectively represent the entire address space of the volume.

At 220, instructions 122 may determine whether volume 140 of computing device 100 is fully provisioned. In some examples, instructions 122 may determine that volume 140 is fully provisioned based on configuration information of computing device 100. For example, each volume of computing device 100 may be associated with type information indicating whether the volume is a fully provisioned (i.e., "thick") volume or a thin provisioned (or "thin") volume. In such examples, instructions 122 may determine that volume 140 is a fully provisioned volume 140 based on the type information associated with volume 140 indicated that it is fully provisioned.

In other examples, instructions 122 may determine that volume 140 based on the generated full list(s) 150. For example, instructions 122 may determine that volume 140 is a fully provisioned volume based on the generated full list(s) 150 including a number of chunk signatures 154 that correlates with (e.g., is proportional to) the total size of volume 140, as that may be a recognizable characteristic of fully provisioned volumes. In other examples, instructions 122 may determine that volume 140 is a fully provisioned volume based on determining that there is one particular chunk signature value that is much more common than all other chunk signatures, which may indicate that it is the chunk signature for the data pattern of the unused region of a fully provisioned volume.

In some examples herein, to reduce the size of the chunk signature lists for fully provisioned volumes, backup agent instructions 121 may omit chunk signatures of chunks having a data pattern of an unused region for the fully provisioned volume. In such examples, instructions 121 may determine a chunk signature for a chunk of an unused region, identify all such chunk signatures 154 in full list(s) 150, and generate 184 thin list(s) 162 that omit those chunk signatures from full list(s) 150. Examples are described in more detail below.

Continuing with method 200, at 225, instructions 122 may determine an unused region chunk signature 130, whose value is represented by "SIGX" in the example of FIG. 1. In some examples, instructions 122 may generate unused region chunk signature 130 (with a value SIGX) by applying a signature function to a collection of data equivalent to a chunk of an unused region of a fully provisioned volume of a computing device. For example, a data pattern of all zeroes (i.e., exclusively zeroes) may be initially stored in all locations of a fully provisioned volume (e.g., as part of an initialization process), in some examples. In such examples, a chunk-sized collection of data made up of all zeroes may be equivalent to a chunk of an unused region of a fully provisioned volume 140, and instructions 122 may generate unused region chunk signature 130 (with a value SIGX) by applying a signature function the chunk-sized collection all zeroes. In examples in which fixed size chunks are used, instructions 122 may generate the unused region chunk signature 130 by applying a signature function to a fixed chunk size (e.g., 4 KB) collection of all zeroes. In examples in which variable size chunks are used, instructions 122 may generate the unused region chunk signature 130 by applying a signature function to a collection of all zeroes having the maximum chunk size.

In other examples, a different data pattern may be stored in unused regions of a fully provisioned volume. For example, a given application using a fully provisioned volume may store an application-specific pattern of zeroes and/or ones (i.e., different from all zeroes) in unused regions of the fully provisioned volume. In such examples, instructions 122 may apply a signature function to a (fixed or maximum variable) chunk sized collection of data having the application-specific pattern of data to determine the unused region chunk signature 130 (with a value SIGX).

In response to a determination that volume 140 is a fully provisioned volume, instructions 121 may generate thin list(s) 162 and usage metadata 166 for volume 140 based on full list(s) 150. In such examples, at 230 of method 200, instructions 126 may compare each chunk signature of full list(s) 150 to the generated unused region chunk signature 130 (having value SIGX), In such examples, instructions 126 may determine that each chunk signature 154 of full list(s) 150 that matches the unused region chunk signature 130 represents a chunk 142 of an unused region of volume 140 (or that is equivalent to a chunk 142 of an unused region of volume 140). In examples described herein, based on the comparisons, instructions 121 may generate thin list(s) 162 including each chunk signature 154 that does not match the unused region chunk signature 130 and omitting each chunk signature 154 that does match the unused region chunk signature 130. Also based on the comparisons, instructions 121 may generate usage metadata indicating, for each chunk of volume 140, whether the chunk represents a region of volume 140 determined to be used or determined to be unused.

Examples will be described herein in relation to elements of FIG. 1, including fully provisioned volume 140 (comprising chunks 142), and full list(s) 150 (comprising chunk signatures 154). In the example of FIG. 1, each illustrated chunk 142 for a used region of volume 140 (i.e., that includes meaningful data) is marked with "U" in FIG. 1 (i.e., for a "used" region), and each illustrated chunk 142 for an unused region of volume 140 (i.e., that includes the data pattern for unused regions) is marked with a "N" in FIG. 1 (i.e., for an "unused" region). In the example of FIG. 1, chunk signatures 154 are illustrated in full list(s) 150 for some of the chunks 142 illustrated in FIG. 1. For example, chunk signatures SIG1, SIG2, and SIG3 in full list(s) 150 represent some of the chunks marked "U" in the first illustrated row of chunks 142, chunk signatures SIGX some of the chunks marked "N" in the second and third illustrated rows of chunks 142, and chunk signatures SIG6, SIG5, and SIG4 represent some of the chunks marked "U" in the third illustrated row of chunks 142.

In some examples, instructions 126 may walk through each chunk signature 154 of full list(s) 150 and, for each chunk signature 154, instructions 126 may determine, at 235, whether the chunk signature 154 matches (i.e., is equal or equivalent to) unused region chunk signature 130 (having value SIGX). If not, then method 200 may proceed to 240 where instructions 126 may add the chunk signature 154 to one of thin list(s) 162 and, at 245, instructions 126 may indicate a used region of fully provisioned volume 140 in usage metadata (such as a usage map 166), for the region (e.g., chunk 142) of volume 140 that corresponds to the current, non-matching chunk signature 154. Returning to 235, if the chunk signature 154 matches unused region chunk signature 130 (having value SIGX), then method 200 may proceed to 250 where instructions 126 may omit the chunk signature 154 from thin list(s) 162 and, at 255, instructions 126 may indicate an unused region of fully provisioned volume 140 in usage metadata (e.g., usage map 166), for the region (i.e., chunk 142) of volume 140 that corresponds to the current, matching chunk signature 154.

Method 200 may proceed to 260 from either of 245 or 255 and, at 260, instructions 126 may determine whether there are further chunk signatures to be compared to unused region chunk signature 130, either in the same full list 150 or in another full list 150. If so, then at 265, instructions 126 may go to the next chunk signature 154 (i.e., in the same full list 150 or in a next one of full list(s) 150), and then return to 235 for the comparison of the next chunk signature 154. In such examples, instructions 126 may generate, for fully provisioned volume 140, thin list backup information 160 including one or more thin lists 162 and usage metadata 166.

Returning to 260, once there are no further chunk signatures 154 to be compared to unused region chunk signature 130, either in the same full list 150 or in another full list 150, then method 200 may proceed to 270, where instructions 128 may cause deduplication backup system 170 to store one or more thin list backup objects 172 for fully provisioned volume 140, the thin list backup object(s) 172 including the one or more thin list(s) 162 and the usage metadata 166 generated from the one or more full list(s) 150.

As described above, instructions 126 may walk full list(s) 150 to compare each chunk signature 154 to the unused region chunk signature 130, as described above. In the example of FIG. 1, after several iterations, instructions 126 may arrive at chunk signature SIG1 of full list(s) 150, which represents one of the chunks 142 marked "U" in the top row of chunks 142 illustrated in FIG. 1. In such examples, instructions 126 may (at 235) compare that chunk signature SIG1 to the unused region chunk signature 130 (SIGX) and determine, at 235, that they do not match. Based on that determination, instructions 126 may store chunk signature SIG1 to one of thin list(s) 162 (at 240), and (at 245) indicate in the usage metadata that the chunk corresponding to that instance of chunk signature SIG1 represents a used region of volume 140 (e.g., by storing a 1 in usage map 166 in a location corresponding to the region of volume 140 represented by that chunk signature SIG1). This process may proceed with the next chunk signatures in full list(s) 150, including chunk signatures SIG2 and SIG3, which instructions 126 may determine do not match the unused region chunk signature 130 (SIGX). In such examples, instructions 126 may copy chunk signatures SIG2 and SIG3 to the thin list(s) 162 (as shown in the example of FIG. 1), and indicate corresponding regions as used in volume 140 (e.g., storing values of 1 in the first illustrated row of usage map 166).

The process may then proceed to the next chunk signature in full list(s) 150, which may be a chunk signature having a value SIGX (as shown in FIG. 1). In such examples, instructions 126 may compare the encountered chunk signature SIGX to the unused region chunk signature 130 (SIGX) (at 235), and determine that they match (e.g., they have the same value, represented by "SIGX"). In this manner, instructions 126 may identify the region represented by the chunk signature SIGX as being an unused region of volume 140 (e.g., illustrated in FIG. 1 by one of the chunks 142 marked "N" in the second row of chunks 142 of FIG. 1). Based on that determination, instructions 126 may omit the chunk signature SIGX from thin list(s) 162 (at 250) (e.g., SIGX is omitted after SIG3 in thin list(s) 162 of FIG. 1), and (at 255) instructions 126 may indicate in the usage metadata that the chunk corresponding to that instance of chunk signature SIGX represents an unused region of volume 140 (e.g., by storing a 0 in usage map 166 in a location corresponding to the region of volume 140 represented by that chunk signature SIGX). This process may proceed with the next chunk signatures in full list(s) 150, including a sequence of chunk signatures all having the value SIGX (illustrated in full list(s) 150 of FIG. 1), which instructions 126 may determine match the unused region chunk signature 130 (SIGX). This sequence of chunk signatures SIGX may correspond to a run of unused regions of fully provisioned volume 140 of FIG. 1, illustrated by the run of chunks 142 having value "N", as illustrated. In such examples, instructions 126 may omit each of the chunk signatures SIGX based on the comparisons, and indicate their corresponding regions of volume 140 as unused (e.g., storing values of 0 in the second and third illustrated rows of usage map 166).

The process may then proceed to chunk signature SIG6 of full list(s) 150, which represents one of the chunks 142 marked "U" in the third row of chunks 142 illustrated in FIG. 1. Instructions 126 may compare that chunk signature SIG6 to the unused region chunk signature 130 (SIGX) and determine, at 235, that they do not match. Based on that determination, instructions 126 may store the chunk signature SIG6 to one of thin list(s) 162 (at 240) following chunk signature SIG3 (as shown in FIG. 1), which was the prior chunk signature before the illustrated sequence of SIGX chunk signatures ("N" chunks 142 of volume 140). Instructions 126 may also (as 245) indicate in the usage metadata that the chunk corresponding to the chunk signature SIG6 represents a used region of volume 140 (e.g., by storing a 1 in a corresponding location of). This process may proceed with the next chunk signatures in full list(s) 150, including chunk signatures SIG5 and SIG6, which instructions 126 may determine do not match the unused region chunk signature 130 (SIGX), so instructions 126 may copy chunk signatures SIG5 and SIG6 to the thin list(s) 162 (as shown in FIG. 1), and indicate corresponding regions as used in volume 140 (e.g., storing values of 1 in the third illustrated row of usage map 166).

In this manner, examples described herein may copy, from full list(s) 150 to thin list(s) 162, each chunk signature that does not match the unused region chunk signature 130 (SIGX), and may omit from thin list(s) 162 each chunk signature that does match the unused region chunk signature 130 (SIGX) and, for each chunk signature, indicate (in usage metadata) whether the region of fully provisioned volume 140 that it represents is a used or unused region. In such examples, instructions 121 may omit from thin list(s) 162 all of the chunk signatures of full list(s) 150 that match the unused region chunk signature 130 (SIGX), and indicate the respective locations of those regions determined to be unused in usage metadata for volume 140, such as a usage map 166. In this manner, examples described herein may reduce the size of chunk signature list(s) for a fully provisioned volume from full list(s) having a collective size proportional to the total size (e.g., maximum capacity) of the fully provisioned volume to thin list(s) having a collective size proportional to the usage of the fully provisioned volume and usage metadata.

In some examples, the usage metadata may comprise a usage map 166, that may comprise a data structure to store data for each region of fully provisioned volume 140 represented by a respective chunk signature 154. For example, in the example of FIG. 1, the usage metadata may comprise a usage map 166, which may include a bitmap to store a one for each chunk 142 of volume 140 determined to be used, and a zero for each chunk 142 of volume 140 determined to be unused, as described above. In the example of FIG. 1, the illustrated portion of usage map 166 corresponds to the illustrated portion of chunks 142 of volume 140, with each chunk 142 of a used region (marked "U") having a corresponding one in usage map 166, and each chunk 142 of an unused region (marked "N") having a corresponding zero in usage map 166. In other examples, the usage map 166 may be implemented in any other suitable manner.

In other examples, the usage metadata may be implemented in any other suitable manner. For example, rather than a usage map, such as a bitmap, the usage metadata may indicate ranges (e.g., address ranges) of volume 140 that are used, omitting the regions of volume 140 that are determined to be unused. In such examples, the used regions may be explicitly indicated and may indicate the regions for which chunk signatures are included in thin list(s) 162. In such examples, the used regions may be indicated in address order, and the chunk signatures may also be included in address order, such that the full list in the correct order may be determined from the explicit indication of ranges and the in-order chunk signatures of the used regions. In such examples, there may be no explicit indication of the unused regions, which may be inferred from the gaps in the regions indicated as used. In other examples, the unused regions may also be explicitly indicated.

As described above, instructions 124 may generate 182 a plurality of full lists 150, each for a respective (contiguous or dis-contiguous) portion of the address space of fully provisioned volume 140. In such examples, for each of the full lists 150, instructions 126 may generate a respective thin list 162 and usage metadata, as described above. For example, for each full list 150, instructions 124 may compare each chunk signature 154 of the full list 150 to the unused region chunk signature 130, generate usage metadata 166 to indicate used regions of fully provisioned volume 140, and generate a respective thin list, from the full list, omitting all of the chunk signatures 154 from the full list 150 that are determined to match the unused region chunk signature 130. In such examples, each of the thin lists 162 (and its corresponding usage metadata) may represent the same respective portion of the volume 140 as the full list 150 from which it was derived.

In such examples, instructions 126 may generate, for fully provisioned volume 140, thin list backup information 160 including one or more thin lists 162 and usage metadata 166. As described above, when instructions 126 determine, at 260, that there are no further chunk signatures 154 of full list(s) 150 to compare to the unused region chunk signature 130 (i.e., "NO" at 260), method 200 may proceed to 270 where instructions 128 may cause deduplication system 170 to store one or more thin list backup objects 172 for the fully provisioned volume 140. In such examples, the thin list backup objects 172 may include the thin list(s) 162 and the usage metadata generated from the full list(s) 150, as described above.

In some examples, instructions 128 may cause deduplication system 170 to store a separate thin list backup object 172 for each thin list 162 generated for fully provisioned volume 140, and a separate thin list backup object 172 for each set of usage metadata 166 corresponding to a one of the thin list(s) 162. In other examples, each thin list backup object 172 may comprise a respective thin list 162 and usage metadata 166 corresponding to that thin list 162.

As described above, in some examples, backup agent instructions 121 may be executed by a computing device 100 (e.g., a primary storage array), by deduplication system 170, or by another computing device (e.g., a server), separate from and in communication with computing device 100 and deduplication system 170 (e.g., via computer network(s)). In the example of FIG. 1, computing device 100 may execute backup agent instructions 121. In such examples, instructions 128 may cause deduplication system 170 to store the thin list backup object(s) 172 by providing thin list backup information 160 (including thin list(s) 162 and usage metadata 166 for each) to deduplication system 170, as shown in FIG. 1. In such examples, instructions 128 may provide the information 160 with appropriate command(s) or instructions to deduplication system 170 to store the components of thin list backup information 160 to thin list backup object(s) 172, as described above.

In other examples, when backup agent instructions 121 are executed by a separate computing device (including generating the thin list(s) and usage metadata), instructions 128 of the separate computing device may similarly cause deduplication system 170 to store the thin list backup object(s) 172 by providing thin list backup information 160 (including thin list(s) 162 and usage metadata 166 for each) to deduplication system 170, as shown in FIG. 1. In other examples, when backup agent instructions 121 are executed by deduplication system 170 (including generating the thin list(s) and usage metadata), instructions 128 cause deduplication system 170 to store the thin list backup object(s) 172 by directly creating and storing those thin list backup object(s) 172 to deduplication system 170 or by causing another component (e.g., agent, instructions, functionality, etc.) of deduplication system 170 to create and store those thin list backup object(s) 172 to storage of deduplication system 170.

In some examples, based on thin list backup information 160 for fully provisioned volume 140, deduplication system 170 compare the chunk signatures 164 of thin list(s) 162 to chunk signatures for chunks already stored on deduplication system 170. In such examples, for each chunk signature 164 for which deduplication system 170 does not find any matching chunk signature for a chunk already stored on deduplication system 170, deduplication system 170 may request computing device 100 to provide the chunk for storage on deduplication system 170. For each chunk signature 164 for which deduplication system 170 finds a match (meaning the corresponding chunk is already stored on deduplication system 170), deduplication system 170 does not request that chunk from computing device 100.

Figure 3:
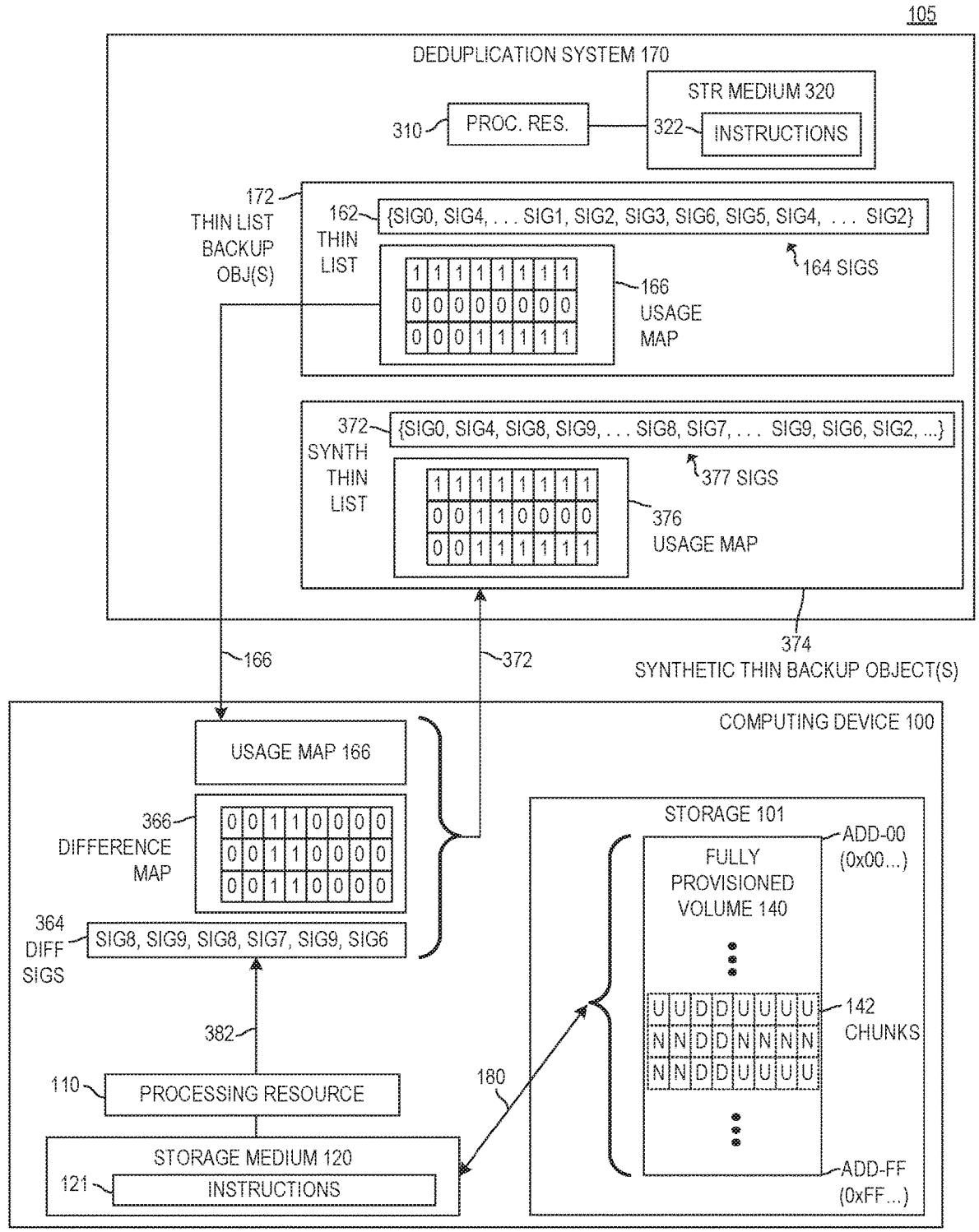
FIG. 3 is a block diagram showing other functionalities of the example computing environment of FIG. 1.
Figure 4:
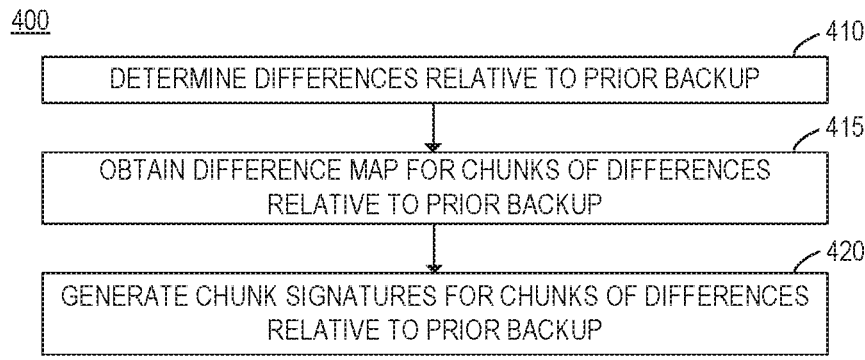
FIG. 4 is a flowchart of an example method that includes generating difference chunk signatures.

Examples of incremental backups, synthetic complete backups, and restore for a fully provisioned volume are described below in relation to FIGS. 3-6. FIG. 3 is a block diagram showing other functionalities of the example computing environment 105 of FIG. 1. FIG. 4 is a flowchart of an example method 400 that includes generating difference chunk signatures 364. In the example illustrated in FIG. 3, computing environment 105 may be as described in relation to FIG. 1, including computing device 100 and deduplication system 170, as described in relation to FIG. 1. In the example of FIG. 3, deduplication system 170 comprises one or more processing resources and at least one machine-readable storage medium 320 comprising instructions 322 executable by the one or more processing resources 310 to perform the functionalities described herein in relation to deduplication system 170 (e.g., in relation to the examples of FIG. 1 and FIG. 3, etc.).

In some examples, after an initial and complete backup of fully provisioned volume 140 at a first point in time (e.g., represented by thin list backup object(s) 172 of deduplication system 170), an incremental backup process may be performed by computing environment 105 to back up, to deduplication system 170, the content of fully provisioned volume 140 at a second point in time later than the first point in time. This incremental backup process may be performed based on the differences in the data content of fully provisioned volume 140 at the second point in time relative to the first point in time.

In such examples, at 410 of method 400, instructions 121 may determine the chunks 142 of fully provisioned volume 140 that are different at the second point in time relative to the earlier first point in time. For example, in the example of FIG. 3, example chunks 142 that are different at the second point in time (e.g., that have been written to) since the first point in time are marked with a "D" (i.e., for "different"), In such examples, it may be efficient to backup just the differences in volume 140 relative to the first point in time, rather than backing up the entire volume 140 again, since there is already a backup of the content of volume 140 at the first point in time. The differences in volume 140 at the second point in time may be determined in any of a number of different ways. For example, instructions 121 (or other instructions of computing device 100) may track the writes to volume 140 since the last backup (e.g., since the first point in time). In other examples, instructions of computing device 100 may take snapshots of the contents of volume 140, including a snapshot at the first point in time and another snapshot at the second point in time, and may compare those snapshots to determine the differences.

At 415, instructions 121 may obtain (e.g., access, generate, etc.) difference metadata 366 indicating respective locations, in fully provisioned volume 140, of each of chunks 142 differing at the second point in time relative to the first point in time. In some examples, instructions 121 may access such difference metadata 366 generated by instructions of computing device 100 that compare respective snapshots of the volume 140 at the first and second points in time. In other examples, instructions 121 may generate the difference metadata 366 to represent the changes to volume 140 between the first and second points in time based on the comparison of the respective snapshots or in any other suitable manner. In some examples, the difference metadata 366 may include a difference map 366 (e.g., a bitmap) indicating, for each chunk 142 of volume 140, either that the chunk is different at the second point in time relative to the first point in time (e.g., indicated by a "1" in FIG. 3) or that the chunk is not different at the second point in time relative to the first point in time (e.g., indicated by a "0" in FIG. 3). For example, in the example illustrated in FIG. 3, difference map 366 comprises a "1" at each location corresponding to a chunk 142 that is different at the second point in time (i.e., the chunks 142 marked with a "D").

At 420, instructions 121 may generate difference chunk signatures 364, comprising a respective chunk signature for each of chunks 142 that is different at the second point in time relative to the first point in time. In FIG. 3, the difference chunk signatures 364 may include chunk signatures SIG6-SIG9, for example, including a respective difference chunk signature 364 for each of the different ("D") chunks 142 of volume 140. In some examples, difference metadata 366 may be arranged in defined order (e.g., address order) such that the locations that the metadata correspond to may be readily determined.

Figure 5:
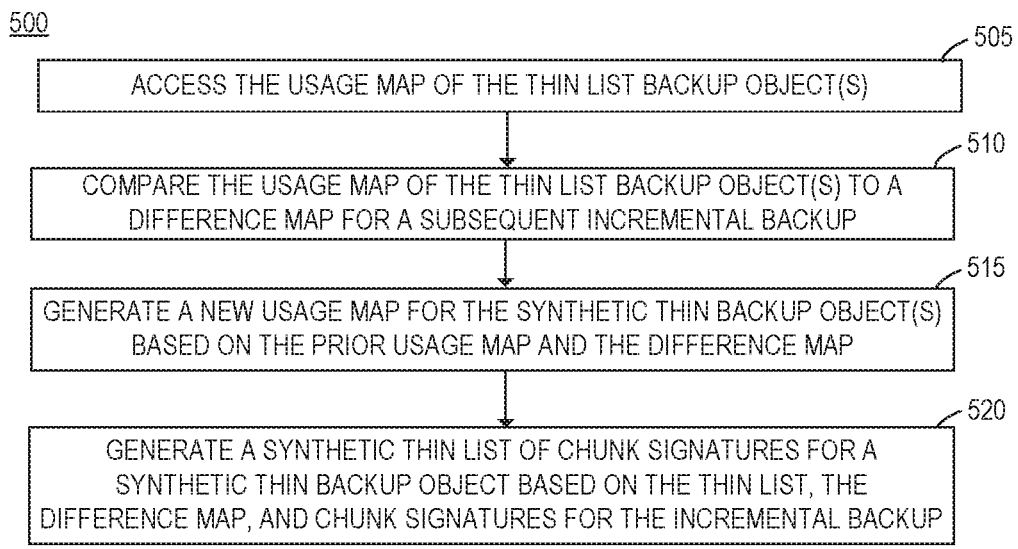
FIG. 5 is a flowchart of an example method that includes generating synthetic thin backup object(s)

An example of generating synthetic thin backup object(s) 374 is described below in relation to FIGS. 3 and 5. FIG. 5 is a flowchart of an example method 500 that includes generating a synthetic thin backup object(s) 374. At 505 of method 500, instructions 121 may retrieve (or otherwise access) usage map 166 from the thin list backup object(s) 172 for comparison with the difference metadata 366. At 510, instructions 121 may compare the accessed usage metadata 166 (e.g., usage map 166) of the thin list backup object(s) 172 to the difference metadata 366 (e.g., difference map 366) corresponding to volume 140 at the second point in time. At 515, instructions 121 may generate new usage metadata 376 (e.g., a usage map 376) to be stored in synthetic thin backup object(s) 374 based at least in part on the comparison of the usage metadata 166 and the difference metadata 366. At 520, instructions 121 may generate one or more synthetic thin list(s) 372 of chunk signatures 377 to be stored in synthetic thin backup object(s) 374, based on the comparison of the usage metadata 166 and the difference metadata 366, the thin list(s) 162, and difference chunk signatures 364.

In such examples, instructions 121 may cause the deduplication system 170 to store one or more new thin list backup object(s) 374 to store the new usage metadata 376 and the synthetic thin list(s) 372, to represent a complete backup of fully provisioned volume 140 at the second point in time. In such examples, the deduplicated data chunks of that complete backup may be stored separately from the thin list backup object(s) 374, though the data stored in the thin list backup object(s) 374 may be sufficient to reconstruct the complete full provisioned volume 140 at the second point in time from the chunks stored in deduplication system 170. Examples of this process are described in more detail below in relation to usage map(s) 166 (of thin list backup object(s) 172) and difference map 366 of FIG. 3, although, in other examples, any other suitable representation of usage metadata 166 and difference metadata 366 may be used. In the example of FIG. 3, usage map(s) 166 and difference map 366 may each include information for each region (i.e., chunk 142) of volume 140.

In the example of FIG. 3, instructions 121 may compare the metadata of usage map(s) 166 and difference map 366. In such examples, for each region (i.e., chunk 142) of volume 140 for which the difference map 366 indicates no difference (e.g., "0") at the second point in time, and usage map(s) 166 indicate a used region (e.g., "1"), instructions 121 may cause deduplication system 170 to copy the chunk signature corresponding to that region from thin list(s) 162 (of backup object(s) 172) to a synthetic thin list 372.

For example, referring to the top left locations of maps 166 and 366 illustrated in FIG. 3, difference map 366 indicates no difference ("0") (meaning the corresponding region of volume 140 does not have different data at the second point in time), and usage map 166 indicates a used region ("1") (meaning that thin list(s) 162 include a chunk signature for that region of volume 140). In such examples, instructions 121 may cause deduplication system 170 to copy the corresponding chunk signature (e.g., SIG0, at the beginning of thin list 162 in FIG. 3) from thin list(s) 162 to synthetic thin list 372, as shown in FIG. 3.

For each region (i.e., chunk 142) of volume 140 for which difference map 366 indicates a difference (e.g., "1") at the second point in time, instructions 121 may cause deduplication system 170 to omit any chunk signature 164 of the thin list(s) 162 corresponding to that region from the synthetic thin list 372, since the data in that region is indicated as being different at the second point in time, and the thin list(s) 162 represent the first point in time. Also for each difference ("1") in difference map 366, instructions 121 may read the different ("D") chunk 142 of volume 140 and determine a difference chunk signature 364 for that different chunk. In such examples, instructions 121 may determine whether that difference chunk signature 364 matches the unused region chunk signature 130 (see FIG. 1). If the difference chunk signature 364 does not match the unused region chunk signature 130, then instructions 121 may copy that difference chunk signature 364 to the synthetic thin list 372 (while omitting any chunk signature 164 of the thin list(s) 162 corresponding to that region), such that synthetic backup object(s) 374 include this representation of different data content of volume 140 at the second point in time. If the difference chunk signature 364 does match the unused region chunk signature 130, then instructions 121 may omit that difference chunk signature 364 from the synthetic thin list 372 and may also omit any chunk signature 164 of the thin list(s) 162 corresponding to that region. In such examples, the difference chunk signature 364 matching the unused region chunk signature 130 indicates that, regardless of whether the corresponding region was a used region in the past, it is determine to be an unused region in volume 140 at the second point in time, and as such the difference chunk signature 364 for that region is to be omitted from the synthetic thin list(s) 172 of the synthetic thin backup object(s) 374 representing a backup of volume 140 at the second point in time.

As an example, referring to the third location from the left in the top row of each of maps 166 and 366 in FIG. 3, difference map 366 indicates a difference ("1"), and based on that instructions 121 may access the different chunk 142 ("D") of volume 140 at the second point in time and generate a difference chunk signature 364 (e.g., SIG8) representing that chunk of volume 140 at the second point in time. Instructions 121 may determine that the chunk signature 364 (e.g., SIG8) does not match the unused region chunk signature 130, and based on that may copy the difference chunk signature 364 (e.g., SIG8) to the synthetic thin list 372 (e.g., SIG8, as shown in FIG. 3), and may omit any chunk signature 164 of the thin list(s) 162 corresponding to the region. This may be the case regardless of the indication in usage map 166, since a "1" would indicate that thin list(s) 162 include a chunk signature for the first point in time (which should be replaced in the synthetic thin list with the later chunk signature), and a "0" would indicate that thin list(s) 162 do not include a chunk signature for the first point in time, so the difference chunk signature 364 may be added to the synthetic thin list(s) 372. In other examples, instructions 121 may determine that the difference chunk signature 364 does match the unused region chunk signature 130, and based on that may omit both that difference chunk signature 364 and any chunk signature 164 of the thin list(s) 162 corresponding to the region.

Instructions 121 may generate usage metadata 376 (e.g., usage map 376) based on the comparisons of difference metadata 366 and usage metadata 166. For example, for each region of volume 140, when the difference map 366 indicates no difference (e.g., "0") for the region, instructions 121 may store, in the usage metadata 376 (e.g., usage map 376) for synthetic thin backup object(s) 374, the same indication for that region as is included in the usage map(s) 166 for that region. For example, when the difference map 366 indicates no difference ("0") for a given region, then the region has not been changed, and should have the same state as the indicated in usage map(s) 166, so instructions 322 may store in usage map 376 an indication that the region is used (e.g., "1") when that is indicated by usage map(s) 166 for the given region and an indication that the region is unused (e.g., "0") when that is indicated by usage map(s) 166 for the given region.

In such examples, when the difference map 366 indicates a difference (e.g., "1") for a given region, instructions 121 may store either an indication that the region is used (e.g., "1") or an indication that the region is unused (e.g., "0") in the usage map 376 (for synthetic thin backup object(s) 374), based on whether the difference chunk signature 364 for that region matches the unused region chunk signature 130 or not. For example, when the difference map 366 indicates a difference (e.g., "1") for a given region, and the difference chunk signature 364 for that region does not match the unused region chunk signature 130, then instructions 121 may store that difference chunk signature 364 in the synthetic thin list(s) 372, as described above, and may store a corresponding indication, in usage map 376, that the region is used (e.g., "1"). When the difference map 366 indicates a difference (e.g., "1") for a given region, and the difference chunk signature 364 for that region matches the unused region chunk signature 130, then the region is determined to be unused at the second point in time, and instructions 121 may omit that difference chunk signature 364 in the synthetic thin list(s) 372, as described above, and may store a corresponding indication, in usage map 376, that the region is unused (e.g., "0").

In some examples, instructions 121 may compare the difference map 366 and the usage map 166 to generate the new usage map 376, which instructions 121 may cause deduplication system 170 to store the new usage map 376 in one of synthetic thin backup object(s) 374. Based on the comparisons, instructions 121 may copy chunk signatures 164 from thin list(s) 162 to synthetic thin list(s) 372, omit chunk signatures 164 from synthetic thin list(s) 372, and copy difference chunk signatures 364 to synthetic thin list(s) 372, as described above. Instructions 121 may cause deduplication system 170 to store synthetic thin list(s) 372 in one or more of synthetic thin backup object(s) 374. In some examples, instructions 121 may cause deduplication system 170 to use a cloning operation to clone indicated portions of thin list(s) 162 to synthetic thin list(s) 372. In such examples, instructions 121 may determine (e.g., based on one or more of usage metadata 166, difference metadata 366, difference chunk signatures 364) one or more contiguous series of chunk signatures 164 of thin list(s) 162 that are to be copied to synthetic thin list(s) 372 and use cloning operations to clone those portions of thin list(s) 162 to synthetic thin list(s) 372, interspersed with difference chunk signatures 364 and/or chunk signature omissions, as described above.

In this manner, examples described herein may generate synthetic thin backup object(s), fully representing the entire content of a fully provisioned volume at a second point in time, based on backup objects for the volume at an earlier first point in time and incremental backup information for a later, second point in time. In such examples, instructions 121 may cause deduplication system 170 to store synthetic thin backup object(s) by comparing the contents of the thin backup object(s) and difference information (such as difference metadata and difference chunk signatures), and copying into the synthetic thin backup object(s) new usage metadata, chunk signature(s) of the difference chunk signatures, and, from the thin backup object(s) for the first point in time, each chunk signature for an unchanged region of volume 140. In examples described herein, by generating thin list(s) of chunk signatures that omit unused regions from full list(s) of chunk signatures when backing up volume 140, as described above, the thin list(s) will likely have far fewer chunk signatures to copy forward (or clone) to the synthetic thin backup object(s), which may result in a much more efficient process of creating the synthetic backup object(s), as described herein. That is, the copying (or cloning) process may have performance that is proportional to the usage of the fully provisioned volume 140 in the examples described herein, rather than proportional to the maximum size of the volume 140 (e.g., if the same were done with the full list(s) for volume 140).

In examples described herein, synthetic thin backup object(s) may be functionally equivalent to thin list backup object(s), and may be referred to herein as thin list backup object(s). In such examples, the modifier "synthetic" indicates that the backup object(s) were generated at least partially from an incremental backup process, from difference information, or a combination thereof (e.g., as described above), though the synthetic backup object(s) still represent the entire content of a volume at a given point in time.

Figure 6:
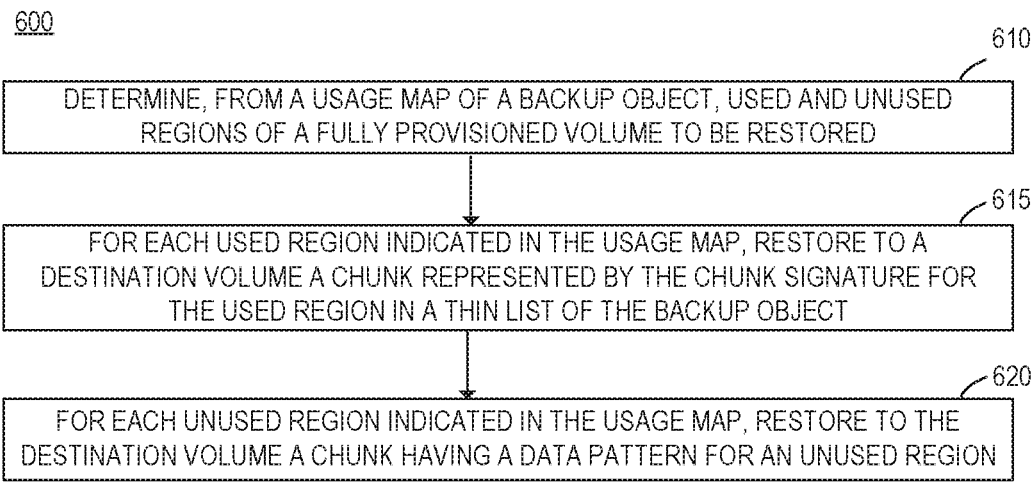
FIG. 6 is a flowchart of an example method that includes performing a restore from thin list backup object(s)

Examples of a restore operation from thin backup object(s) will now be described herein in relation to FIGS. 3 and 6. FIG. 6 is a flowchart of an example method 600 that includes performing a restore from thin list backup object(s). At 610 of method 600, instructions 322 may determine, from usage metadata of thin list backup object(s), used and unused regions of a backed up, fully provisioned volume to be restored. At 615, for each given used region of the fully provisioned volume indicated in the usage metadata, instructions 322 may restore, to the same given region (i.e., address space) of a fully provisioned destination volume, a chunk represented by the chunk signature for that region in the thin list backup object(s). At 620, for each given unused region of the fully provisioned volume indicated in the usage metadata, instructions 322 may restore a chunk having a data pattern for an unused region to the same given region (i.e., address space) of the fully provisioned destination volume.

As an example, instructions 322 may perform a restore operation from synthetic thin backup object(s) 374, representing fully provisioned volume 140 at a second point in time, as described above in relation to examples illustrated in FIG. 3. In some examples, a destination computing device (e.g., computing device 100 or another) may create a destination fully provisioned volume to receive the restore of volume 140 as it existed at the second point in time, as described above. In such examples, at 610, instructions 322 may determine, from usage map 376, the used and unused regions of volume 140 at the second point in time. At 615, for each used region of volume 140 indicated in the usage map 376, instructions 322 may restore a chunk (from deduplication system 170) represented by the respective chunk signature 377 corresponding to that region and stored in the synthetic thin list 372. In such examples, instructions 322 may restore that chunk to the same region (e.g., address space) in the destination volume as it was stored in the source volume 140 (as represented at the time of the backup). At 620, for each unused region of volume 140 indicated in the usage map 376, instructions 322 may restore (to the same region of the destination volume) a chunk having the defined data pattern for an unused region of the fully provisioned volume. For example, if the data pattern stored in an unused region of volume 140 is a chunk of all zeroes, then a chunk of all zeroes may be restored to the destination volume, based on the indication in usage map 376 that the region is unused (even though a chunk signature of that region is not stored in the thin backup object(s) 374, as described above).

Figure 7:
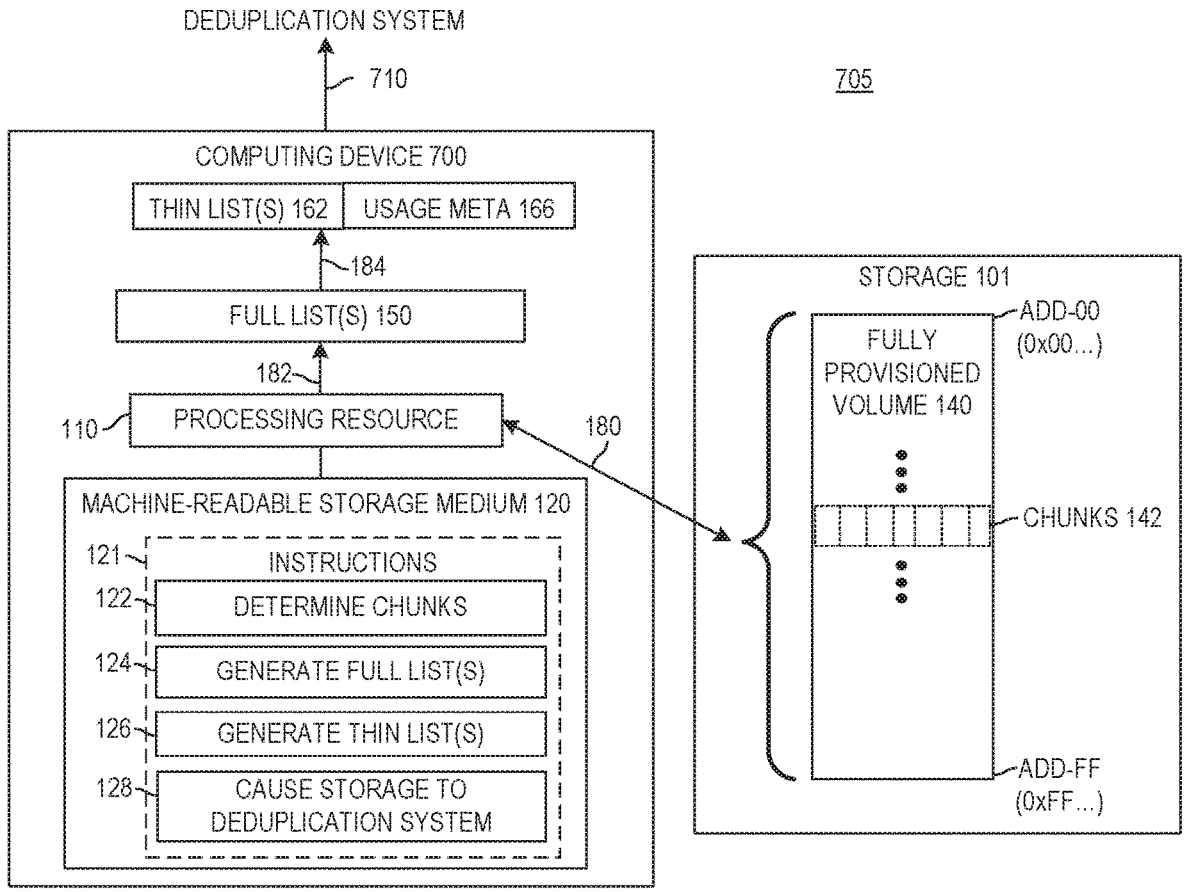
FIG. 7 is a block diagram of an example computing environment to cause storage of thin list backup object(s) to a deduplication system.
Figure 8:
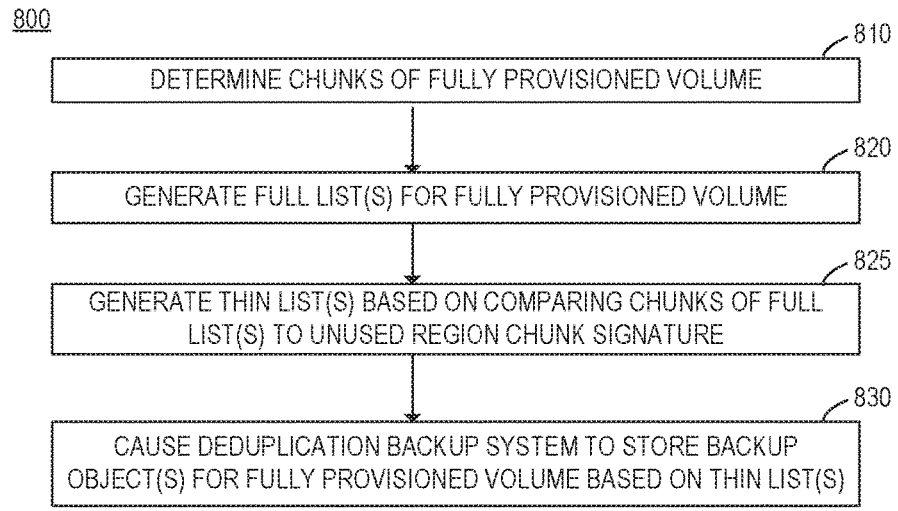
FIG. 8 is a flowchart of an example method that includes generating thin list(s) of chunk signatures.

FIG. 7 is a block diagram of an example computing environment 705 to cause storage of thin list backup object(s) to a deduplication system. FIG. 8 is a flowchart of an example method 800 that includes generating thin list(s) of chunk signatures. In the example of FIG. 7, computing device 700 may comprise at least one processing resource 110 and at least one machine-readable storage medium 120 storing instructions 121 (executable by the at least one processing resource 110), as described above in relation to FIG. 1. Computing environment 705 may also include storage 101 comprising a fully provisioned volume 140, as described above in relation to FIG. 1. Although execution of method 800 is described below with reference to computing device 700 of FIG. 7, other computing devices or systems suitable for the execution of method 800 may be utilized (e.g., computing device 100 of FIG. 1, etc.). Additionally, implementation of method 800 is not limited to such examples.

At 810 of method 800, instructions 122 may determine a set of chunks 142 comprising the data content of an entire address space of fully provisioned volume 140 of a computing system. In some examples, computing device 700 may comprise storage 101. In other examples, storage 101 may be remote from but accessible to computing device 700 (e.g., via computer network(s)). At 820, instructions 124 may generate 182 one or more full lists 150 of chunk signatures. In such examples, when there is one full list 150, the full list comprises chunk signatures for all the chunks 142 of the entire address space of volume 140. In other examples, when there are a plurality of full lists 150 for volume 140, each full list 150 comprises chunk signatures for the chunks of a respective contiguous portion or multiple discontinuous portions of the address space of the fully provisioned volume. In such examples, the full lists 150 collectively represent the data content of the entire address space of the fully provisioned volume 140.

At 825, instructions 126 may generate 184 one or more thin lists 162 and usage metadata 166 based on comparing each chunk signature of the full list(s) 150 to an unused region chunk signature representing a chunk of an unused region of the fully provisioned volume 140. In such examples, for each full list, instructions 126 may compare each chunk signature of the full list to the unused region chunk signature (as described above) representing a chunk of an unused region of the fully provisioned volume 140. In such examples, instructions 126 may generate 184 usage metadata 166 to indicate used regions of the fully provisioned volume 140 based on the comparisons, and may generate, from the respective full list 150, a respective thin list 162 omitting all chunk signatures from the respective full list 150 determined to match the unused region chunk signature based on the comparisons. At 830, instructions 128 may cause 710 a deduplication backup system to store one or more thin list backup object(s) for the fully provisioned volume 140, including the one or more thin lists 162 and the usage metadata 166 generated from the one or more full lists 150.

All of the features disclosed in this specification (including any accompanying claims, abstract and drawings), and/or all of the elements of any method or process so disclosed, may be combined in any combination, except combinations where at least some of such features and/or elements are mutually exclusive. For example, functionalities described herein in relation to any of FIGS. 1-8 may be provided in combination with functionalities described herein in relation to any other of FIGS. 1-8.

Although each of the various flowcharts included and described herein shows a specific order of performance of certain functionalities, the respective methods represented by those flowcharts are not limited to that order. For example, functionalities shown in succession in any flowchart may be performed in a different order, may be executed concurrently or with partial concurrence, or a combination thereof. In examples described herein, the phrase "based on" is not exclusive and should not be read as "based exclusively on". Rather, the phrase "based on" as used herein is inclusive and means the same as the alternative phrasing "based at least on" or "based at least in part on". As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, storage device, storage array, backup appliance, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch; decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions; or remote from but accessible to the computing device (e.g., via a computer network) for execution. In the examples illustrated herein, a storage medium 120 may be implemented by one machine-readable storage medium, or multiple machine-readable storage media.

In examples described herein, a storage array may be a computing device comprising a plurality of storage devices and one or more controllers to interact with host devices and control access to the storage devices. In some examples, the storage devices may include HDDs, SSDs, or any other suitable type of storage device, or any combination thereof. In some examples, the controller(s) may virtualize the storage capacity provided by the storage devices to enable a host to access a virtual object (e.g., a volume) made up of storage space from multiple different storage devices.

In some examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein.

What is claimed is:

1. A method comprising:
    determining a set of chunks comprising data content of an entirety of an address space of a fully provisioned volume of a computing system;
    generating one or more full lists of chunk signatures, each full list comprising chunk signatures for the chunks of all or a respective portion of the address space of the fully provisioned volume, the one or more full lists collectively representing the data content of the entirety of the address space of the fully provisioned volume at a first point in time;
    for each full list:
        performing a plurality of comparisons comparing each chunk signature of the full list to an unused region chunk signature representing a chunk of an unused region of the fully provisioned volume;

generating usage metadata to indicate used regions and unused regions of the fully provisioned volume, based on the comparisons; and generating, from the full list, a thin list omitting each of at least one of the chunk signatures from the full list that is determined to match the unused region chunk signature based on the comparisons; and causing a deduplication backup system to store one or more thin list backup objects for the fully provisioned volume, including the one or more thin lists and the usage metadata generated from the one or more full lists; and generating one or more synthetic thin backup objects representing the fully provisioned volume at a second point in time, based on difference metadata representing changes in the fully provisioned volume between the first and second points in time;

the generating comprising, for each used region and each unused region of the fully provisioned volume:
when the difference metadata indicates a difference for the region:
storing, in usage metadata of one of the one or more synthetic thin backup objects, an indication that the region is used or that the region is unused, based on whether a chunk signature for changed data in the region matches the unused region chunk signature.

2. The method of claim 1, further comprising:
generating the unused region chunk signature by applying a signature function to a collection of data equivalent to a chunk of an unused region of a fully provisioned volume.

3. The method of claim 2, wherein:
the collection of data equivalent to a chunk of an unused region is a collection of data consisting of exclusively zeroes; and
the unused region chunk signature is a chunk signature of a collection of data consisting of exclusively zeroes.

4. The method of claim 1, further comprising:
determining chunks of the fully provisioned volume that are different at the second point in time later than the first point in time;
generating one or more difference chunk signatures, each comprising a chunk signature for a respective one of the chunks differing at the second point in time, based on the difference metadata, wherein the difference metadata indicates:
for each of the chunks of the fully provisioned volume, whether or not the chunk differs at the second point in time later than the first point in time; and
for each of the chunks differing at the second point in time, the location of the differing chunk in the fully provisioned volume; and
causing the deduplication backup system to store one or more new thin list backup objects for the fully provisioned volume based on the difference metadata and the one or more difference chunk signatures.

5. The method of claim 4, the method comprising:
comparing the usage metadata of the one or more thin list backup objects to the generated difference metadata;
generating usage metadata for the one or more synthetic thin backup objects based on the usage metadata of the one or more thin list backup objects and the difference metadata; and
generating a synthetic thin list of chunk signatures for the one or more synthetic thin backup objects based on the thin list, the difference metadata, and the one or more difference chunk signatures.

6. The method of claim 5, wherein the generating the synthetic thin list of chunk signatures comprises:
for each region of the fully provisioned volume for which the difference metadata indicates no chunk differing at the second point in time and the usage metadata of the one or more thin list backup objects indicates a used region, copying the chunk signature corresponding to the region from the one or more thin lists to the synthetic thin list of chunk signatures; and
for each region of the fully provisioned volume for which the difference metadata indicates a difference:
copying a given one of the one or more difference chunk signatures corresponding to the region to the synthetic thin list of chunk signatures, when the given difference chunk signature does not match the unused region chunk signature.

7. The method of claim 5, wherein the generating the one or more synthetic thin backup objects comprises:
for each used region and each unused region of the fully provisioned volume:
when the difference metadata indicates no difference for the region, storing, in the usage metadata of the synthetic thin backup object, the same indication of whether the region is used or unused as is included for the region in the usage metadata of the one or more thin list backup objects.

8. The method of claim 1, further comprising:
determining, from usage metadata of the one or more thin list backup objects, used and unused regions of the fully provisioned volume to be restored;
for each used region of the fully provisioned volume indicated in the usage metadata, restoring, to the region of a fully provisioned destination volume, a chunk represented by the chunk signature for that region in the thin list backup object; and
for each unused region of the fully provisioned volume indicated in the usage metadata, restoring, to the region of the fully provisioned destination volume, a chunk having a data pattern for an unused region.

9. The method of claim 8, wherein the data pattern for the unused region consists of all zeroes.

10. The method of claim 1, comprising:
providing the one or more thin lists and the usage metadata generated from the one or more full lists to a deduplication backup system from a computing device separate from the deduplication backup system, wherein the computing device performed the generating of the one or more thin manifests.

11. An article comprising a non-transitory machine-readable storage medium comprising instructions executable by at least one processor to:
generate an unused region chunk signature by applying a signature function to a collection of data equivalent to a chunk of an unused region of a fully provisioned volume of a computing device;
determine a set of chunks comprising data content of an entirety of an address space of the fully provisioned volume;
generate one or more full lists of chunk signatures, each full list comprising chunk signatures for the chunks of all or a respective portion of the address space of the fully provisioned volume, the one or more full lists collectively representing the data content of the entirety of the address space of the fully provisioned volume at a first point in time;

for each full list:
    perform a plurality of comparisons to compare each chunk signature of the full list to the unused region chunk signature;
    generate usage metadata to indicate used regions and unused regions of the fully provisioned volume, based on the comparisons; and
    generate, from the full list, a thin list omitting each of at least one of the chunk signatures from the full list that is determined to match the unused region chunk signature based on the comparisons; and
cause a deduplication backup system to store one or more thin list backup objects for the fully provisioned volume, including the one or more thin lists and the usage metadata generated from the one or more full lists; and
generate one or more synthetic thin backup objects representing the fully provisioned volume at a second point in time, based on difference metadata representing changes in the fully provisioned volume between the first and second points in time, the generating comprising, for each used region and each unused region of the fully provisioned volume:
    when the difference metadata indicates a difference for the region:
        store, in usage metadata of one of the one or more synthetic thin backup objects, an indication that the region is used or that the region is unused, based on whether a chunk signature for changed data in the region matches the unused region chunk signature.

12. The article of claim 11, wherein the instructions are executable to:
    provide the one or more thin lists and the usage metadata generated from the one or more full lists from a storage array to the deduplication backup system to cause the deduplication backup system to store the one or more thin list backup objects.

13. The article of claim 11, wherein the instructions are executable to:
    provide the one or more thin lists and the usage metadata generated from the one or more full lists from a computing device to the deduplication backup system to cause the deduplication backup system to store the one or more thin list backup objects, wherein the computing device is separate from a storage array storing the fully provisioned volume and is separate from the deduplication backup system.

14. The article of claim 11, wherein the collection of data equivalent to a chunk of an unused region is a collection of data consisting of all zeroes.

15. The article of claim 11, wherein the instructions are executable to:
    determine chunks of the fully provisioned volume that are different at the second point in time later than the first point in time;
    generate one or more difference chunk signatures, each comprising a chunk signature for a respective one of the chunks differing at the second point in time, based on the difference metadata, wherein the difference metadata indicates:
        for each of the chunks of the fully provisioned volume, whether or not the chunk differs at the second point in time later than the first point in time; and
        for each of the chunks differing at the second point in time, the location of the differing chunk in the fully provisioned volume; and
    cause the deduplication backup system to store one or more new thin list backup objects for the fully provisioned volume based on the difference metadata and the one or more difference chunk signatures.

16. The article of claim 11, the instructions executable to:
    determine that the volume is fully provisioned; and
    generate the one or more thin lists and the usage metadata in response to the determination that the volume is fully provisioned.

17. A computing device comprising:
    at least one processor; and
    at least one non-transitory machine-readable storage medium comprising instructions executable by at least one processor to:
        determine that a volume of a computing system is a fully provisioned volume;
        determine a set of chunks comprising data content of an entirety of an address space of the fully provisioned volume of the computing system;
        generate a full list of chunk signatures representing the data content of the entirety of the address space of the fully provisioned volume at a first point in time, the full list of chunk signatures including a respective chunk signature for each chunk of the set of chunks;
        compare each chunk signature of the full list to an unused region chunk signature representing a chunk of an unused region of the fully provisioned volume;
        generate a usage map indicating used regions and unused regions of the fully provisioned volume based on the comparisons;
        generate, from the full list, a thin list of chunk signatures omitting each of at least one of the chunk signatures from the full list that are determined to match the unused region chunk signature;
        store a thin list backup object representing the fully provisioned volume in a deduplication backup system based on the thin list and the usage map; and
        generate one or more synthetic thin backup objects representing the fully provisioned volume at a second point in time, based on difference metadata representing changes in the fully provisioned volume between the first and second points in time, the generating comprising, for each used region and each unused region of the fully provisioned volume:
            when the difference metadata indicates a difference for the region:
                store, in usage metadata of one of the one or more synthetic thin backup objects, an indication that the region is used or that the region is unused, based on whether a chunk signature for changed data in the region matches the unused region chunk signature.

18. The computing device of claim 17, wherein the instructions are executable to:
    determine chunks of the fully provisioned volume that are different at the second point in time later than the first point in time;
    generate one or more difference chunk signatures, each comprising a chunk signature for a respective one of the chunks differing at the second point in time, based on the difference metadata, wherein the difference metadata indicates,
        for each of the chunks of the fully provisioned volume, whether or not the chunk differs at the second point in time later than the first point in time; and for each of the chunks differing at the second point in time, the location of the differing chunk in the fully provisioned volume; and cause the deduplication backup system to store a new thin list backup object for the fully provisioned volume based on the difference metadata and the one or more difference chunk signatures.

19. The computing device of claim 17, the instructions to:

generate the unused region chunk signature by applying a signature function to a collection of data equivalent to a chunk of an unused region of a fully provisioned volume.

20. The computing device of claim 19, wherein the collection of data equivalent to a chunk of an unused region of a fully provisioned volume consisting of all zeroes.

* * * * *